(12) United States Patent
Yoshida et al.

(10) Patent No.: US 7,982,964 B2
(45) Date of Patent: Jul. 19, 2011

(54) LIQUID LENS DEVICE AND MANUFACTURING METHOD THEREFOR

(75) Inventors: Tetsuyuki Yoshida, Tokyo (JP); Miki Tsuchiya, Kanagawa (JP); Yuichi Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/724,979

(22) Filed: Mar. 16, 2010

(65) Prior Publication Data

US 2010/0254021 A1 Oct. 7, 2010

(30) Foreign Application Priority Data

Apr. 2, 2009 (JP) ................ P2009-089846

(51) Int. Cl.
*G02B 1/06* (2006.01)
*G02B 3/12* (2006.01)
(52) U.S. Cl. ........................................ 359/665
(58) Field of Classification Search .......... 359/665, 359/666, 667, 319, 245
See application file for complete search history.

(56) References Cited

U.S. PATENT DOCUMENTS 6,950,219 B2 * 9/2005 Onuki et al. .......... 359/665

FOREIGN PATENT DOCUMENTS

JP 2007-225779 6/2007

* cited by examiner

*Primary Examiner* — Alicia M Harrington
(74) *Attorney, Agent, or Firm* — K&L Gates LLP (57) ABSTRACT

A manufacturing method for a liquid lens device includes the steps of: preparing a body having a liquid chamber, a conductive first liquid stored in the liquid chamber, an insulating second liquid stored in the liquid chamber, and a hollow electrode pipe for making the communication between the inside and the outside of the liquid chamber, the liquid chamber being defined by a first transparent substrate on which an electrode layer is formed, a second transparent substrate opposed to the first transparent substrate, and an annular sealing member interposed between the first transparent substrate and the second transparent substrate; applying pressure to the first and second transparent substrates to thereby compress the sealing member and discharge the first liquid from the second end of the hollow electrode pipe; and closing the second end of the hollow electrode pipe.

9 Claims, 6 Drawing Sheets

LIQUID LENS DEVICE AND MANUFACTURING METHOD THEREFOR

CROSS REFERENCES TO RELATED APPLICATIONS

The present application claims priority to Japanese Priority Patent Application JP 2009-089846 filed in the Japan Patent Office on Apr. 2, 2009, the entire content of which is hereby incorporated by reference.

BACKGROUND

The present application relates to a liquid lens device utilizing an electrowetting phenomenon and a manufacturing method for such a liquid lens device.

In recent years, development has been advanced on an optical element utilizing an electrowetting phenomenon. The electrowetting phenomenon is a phenomenon such that when a voltage is applied between an electrode and a conductive liquid opposed to each other with an insulator interposed therebetween, the insulator is charged to cause a change in free energy of the interface between the insulator and the liquid, so that the shape (contact angle) of the surface of the liquid is changed.

Such an optical element can be applied to a variable focus lens, for example (see Japanese Patent Laid-open No. 2007-225779 (paragraph [0039], FIG. 1), for example). In this patent document, there is described an optical element having a lens surface formed by the interface between a conductive first liquid and an insulating second liquid stored in a liquid chamber. The liquid chamber is defined by a transparent substrate, a light transmitting container, and a sealing member interposed between the transparent substrate and the light transmitting container. The transparent substrate has an electrode layer covered with an insulating film. The container is provided with a rod electrode kept in contact with the first liquid. When a voltage is applied between the rod electrode and the electrode layer, an electrowetting phenomenon is exhibited to thereby change the shape of the lens surface.

In manufacturing the optical element as mentioned above, the liquid chamber is sealed to avoid the leakage of the liquid. The sealing member is used as a component of the liquid chamber. After the liquid is charged into the liquid chamber, pressure is applied to the liquid chamber so as to compress the sealing member, so that the liquid chamber is sealed by an elastic force of the sealing member.

SUMMARY

However, there is a case that pressure as an overload may be applied to the liquid chamber in the sealing step for the liquid chamber. Also in this case, the sealing member is compressed and the pressure in the liquid chamber is increased by the overload to possibly damage the liquid chamber. Accordingly, skill is required for the sealing operation for the liquid chamber or a high-precision press is required, causing a reduction in workability and an increase in equipment cost.

It is desirable to provide a manufacturing method for a liquid lens device which can improve the workability in sealing the liquid chamber.

It is also desirable to provide a liquid lens device manufactured by such a method.

In accordance with an embodiment of the present application, there is provided a manufacturing method for a liquid lens device including the step of preparing a body having a liquid chamber, a conductive first liquid stored in the liquid chamber, an insulating second liquid stored in the liquid chamber, and a hollow electrode pipe for making the communication between the inside and the outside of the liquid chamber. The liquid chamber is defined by a first transparent substrate on which an electrode layer is formed, a second transparent substrate opposed to the first transparent substrate, and an annular sealing member interposed between the first transparent substrate and the second transparent substrate. The first liquid and the second liquid have different refractive indices and are immiscible with each other. The hollow electrode pipe has a first end kept in contact with the first liquid and a second end located outside of the liquid chamber. The method further includes the steps of: applying pressure to the first and second transparent substrates to thereby compress the sealing member and discharge the first liquid from the second end of the hollow electrode pipe; and closing the second end of the hollow electrode pipe.

In the step of applying pressure to the first and second transparent substrates to thereby compress the sealing member, the first liquid stored in the liquid chamber is discharged from the second end of the electrode pipe. Accordingly, even when the pressure as an overload is applied to the liquid chamber, an excess rise in pressure in the liquid chamber can be suppressed to thereby prevent damage to the liquid chamber. Accordingly, no skill is required for the sealing operation for the liquid chamber, and no high-precision press is also required. Thus, the workability in sealing the liquid chamber can be improved.

Preferably, the step of preparing the body includes the steps of mounting the electrode pipe to the sealing member so that the first end of the electrode pipe projects from the inner surface of the sealing member and the second end of the electrode pipe projects from the outer surface of the sealing member; placing the sealing member with the electrode pipe on the first transparent substrate; charging the first liquid and the second liquid into a space formed by the first transparent substrate and the sealing member; and placing the second transparent substrate on the sealing member.

Since the electrode pipe is mounted to the sealing member, the spacing between the electrode pipe and the sealing member can be sealed by an elastic force of the sealing member. Accordingly, any additional sealing member for ensuring the sealed condition of the liquid chamber is not required at a portion for mounting the electrode pipe, so that a reduction in the workability in sealing the liquid chamber can be prevented. Furthermore, after the electrode pipe is securely mounted to the sealing member, the sealing member is placed on the first transparent substrate, so that the reliability in sealing the liquid chamber can be improved.

Preferably, the step of closing the second end includes the step of swaging the second end. The closing of the second end by swaging is a simple operation, so that an increase in equipment cost can be suppressed.

Preferably, the manufacturing method further includes the step of further applying pressure to the first and second transparent substrates to thereby further compress the sealing member after performing the step of closing the second end.

Even when the sealing member is further compressed or the pressure in the liquid chamber is adjusted after the closing step, the first liquid is discharged before the closing step, thereby suppressing an excess rise in pressure in the liquid chamber to reduce the possibility of damage to the liquid chamber.

Preferably, the step of further applying pressure includes the step of fixing the first and second transparent substrates to each other by using a fixing member.

In this manner, the sealing member may be further compressed by the first and second transparent substrates in fixing the first and second transparent substrates by using the fixing member. Further, in adjusting the pressure in the liquid chamber, the sealing member may be further compressed by the fixing member mounted to the first and second transparent substrates. Thereafter, the first and second transparent substrates may be fixed. Thus, the first and second transparent substrates are fixed by the fixing member to thereby ensure the sealed condition of the liquid chamber.

Preferably, the manufacturing method further includes the step of connecting the second end closed and the electrode layer to a power circuit provided outside of the body. Accordingly, the electrode pipe is used as a terminal for exhibiting an electrowetting phenomenon.

In accordance with another embodiment of the present application, there is provided a liquid lens device including: a conductive first liquid; an insulating second liquid having a refractive index different from that of the first liquid; and a body having a sealed liquid chamber defined by a first transparent substrate having a light transmitting area, a second transparent substrate having a light transmitting area opposed to the first transparent substrate, and an annular sealing member interposed between the first transparent substrate and the second transparent substrate, the liquid chamber storing the first liquid and the second liquid immiscible with each other. The liquid lens device further includes: an electrode layer formed on a part of the inner surface of the liquid chamber, the electrode layer having a laminated structure composed of a conductor layer and an insulating layer covering the conductor layer; and a hollow electrode pipe including a hollow conductor pipe having a first end as an open end kept in contact with the first liquid in the liquid chamber and a second end as a closed end located outside of the liquid chamber, wherein when a voltage is applied between the first liquid and the electrode layer through the electrode pipe, the shape of the interface between the first liquid and the second liquid is changed.

In this liquid lens device, the second end of the electrode pipe is originally open in order that the first liquid can be discharged from the second end in sealing the liquid chamber. In this manner, the use of the electrode pipe can improve the workability in sealing the liquid chamber. Finally, the second end is closed to ensure the sealed condition of the liquid chamber. The electrode pipe having the second end thus closed is used as a terminal for exhibiting an electrowetting phenomenon. Thus, the electrode pipe can be used both as a component for improving the workability in sealing the liquid chamber and as a terminal for exhibiting an electrowetting phenomenon.

Preferably, the inner surface of the sealing member forms a part of the inner surface of the liquid chamber; and the electrode pipe is inserted through the sealing member so that the first end projects from the inner surface of the sealing member and the second end projects from the outer surface of the sealing member.

Since the electrode pipe is mounted to the sealing member, the spacing between the electrode pipe and the sealing member can be sealed by an elastic force of the sealing member. Accordingly, any additional sealing member for ensuring the sealed condition of the liquid chamber is not required at a portion for mounting the electrode pipe. That is, the sealed condition of the liquid chamber can be ensured without increasing the number of parts of the liquid lens device.

Preferably, the liquid lens device further includes a fixing member for fixing the first and second transparent substrates to each other. Since the first and second transparent substrates are fixed by the fixing member, the sealed condition of the liquid chamber can be further ensured.

According to the present application as described above, the workability in sealing the liquid chamber can be improved.

Additional features and advantages are described herein, and will be apparent from the following Detailed Description and the figures.

DETAILED DESCRIPTION

The present application will now be described with reference to the drawings according to an embodiment. Although examples of various materials etc. are shown in the following description, it should be construed that the materials etc. are not limited to these examples.

[Configuration of Liquid Lens Device]

Figure 1:
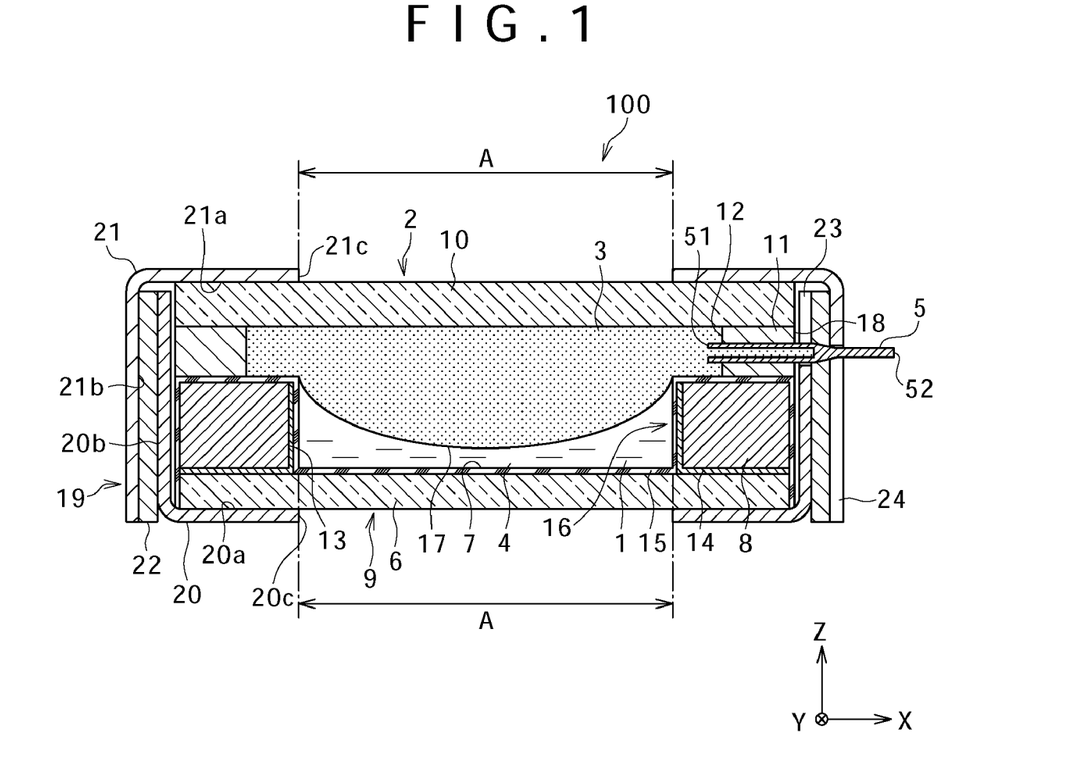
FIG. 1 is a schematic sectional view showing a liquid lens device according to a preferred embodiment of the present application.

FIG. 1 is a schematic sectional view showing a liquid lens device 100 according to a preferred embodiment of the present application. The liquid lens device 100 includes a body 2 having a sealed liquid chamber 1, a first liquid 3 stored in the liquid chamber 1, a second liquid 4 stored in the liquid chamber 1, and a hollow electrode pipe 5.

The body 2 includes a first transparent substrate 9 composed of a light transmitting substrate 6 and a base substrate 8 bonded to one surface 7 of the light transmitting substrate 6. The base substrate 8 is formed with a through hole 13. The body 2 further includes a second transparent substrate 10 and an annular sealing member 11 mounted between the base substrate 8 and the second transparent substrate 10. The liquid chamber 1 is formed as a space enclosed by the first transparent substrate 9, the second transparent substrate 10 opposed to the first transparent substrate 9 with the sealing member 11 interposed therebetween, an inner surface 12 of the sealing member 11, and an inner surface of the base substrate 8 forming the through hole 13.

Each of the light transmitting substrate 6 and the second transparent substrate 10 is formed of a material having high transparency, such as glass and acrylic resin, and has a light transmitting area A as a passage of light entering the liquid lens device 100 or light emerging from the liquid lens device 100. The light passing through the light transmitting area A enters or emerges through the through hole 13 of the base substrate 8, so that the shape of the through hole 13 as viewed in plan (as viewed in the Z direction shown in FIG. 1) corresponds to that of the light transmitting area A. Examples of the shape of the through hole 13 as viewed in plan include oval, circular, elliptical, and rectangular shapes. As a modification, the base substrate 8 may be formed with a plurality of through holes 13 so that the liquid lens device 100 may be used as a lens array.

The base substrate 8 is formed of synthetic resin, metal, glass, or ceramic, for example. The sealing member 11 is formed of elastomer or synthetic resin, for example, so as to be capable of sealing the first liquid 3 and the second liquid 4 stored in the liquid chamber 1.

A conductor layer 14 is formed on the inner surface of the base substrate 8. The conductor layer 14 is connected through a spacing between the base substrate 8 and the light transmitting substrate 6 to a power circuit (not shown). Further, an insulating layer 15 for covering the conductor layer 14 is formed on the first transparent substrate 9. The insulating layer 15 is so formed as to avoid the contact between the conductor layer 14 and the first and second liquids 3 and 4 in the liquid chamber 1. The insulating layer 15 is also formed on the upper surface of the first transparent substrate 9 as the inner surface of the liquid chamber 1. The conductor layer 14 and the insulating layer 15 are laminated on the inner surface of the through hole 13, and this laminated structure of the conductor layer 14 and the insulating layer 15 forms an electrode layer 16.

The conductor layer 14 is a transparent thin film of tin oxide or ITO (Indium Tin Oxide), for example, formed by sputtering or plating, for example. The insulating layer 15 has water repellency and it is a thin film of parylene (p-xylylene resin) or inorganic material, for example, formed by various coating methods such as CVD (Chemical Vapor Deposition).

The first liquid 3 and the second liquid 4 stored in the liquid chamber 1 have different refractive indices (absolute refractive indices) and are immiscible with each other in the liquid chamber 1. The first liquid 3 and the second liquid 4 may have the same specific gravity. The interface 17 between the first liquid 3 and the second liquid 4 corresponds to a lens surface in the liquid lens device 100 (this lens surface will be hereinafter referred to as the lens surface 17). In this preferred embodiment, the refractive index of the second liquid 4 is larger than that of the first liquid 3. However, the refractive index of the first liquid 3 may be larger than that of the second liquid 4.

The first liquid 3 is a transparent conductive liquid. For example, an inorganic liquid such as water and electrolyte solution (aqueous solution of electrolyte such as potassium chloride, sodium chloride, or lithium chloride) may be used as the first liquid 3. Further, an organic liquid such as alcohol having a low molecular weight (e.g., methyl alcohol or ethyl alcohol) and ordinary temperature molten salt (ionic liquid) may be also used as the first liquid 3.

On the other hand, the second liquid 4 is a transparent insulating liquid. For example, a nonpolar solvent of hydrocarbon material such as decane, dodecane, hexadecane, or undecane may be used as the second liquid 4. Further, a nonpolar solvent of hydrophobic material such as silicone oil or fluorine material may be also used as the second liquid 4.

As shown in FIG. 1, the first liquid 3 and the second liquid 4 stored in the liquid chamber 1 are immiscible with each other, so that they are separated in two layers. In this preferred embodiment, the insulating layer 15 having water repellency is formed on the first transparent substrate 9. Accordingly, the first liquid 3 is repelled by the insulating layer 15 to gather adjacent to the second transparent substrate 10. On the other hand, the second liquid 4 wets the surface of the insulating layer 15.

The hollow electrode pipe 5 is mounted to the sealing member 11 so as to be inserted therethrough. The electrode pipe 5 has a first end 51 and a second end 52. The first end 51 is an open end projecting from the inner surface 12 of the sealing member 11 into the liquid chamber 1 to come into contact with the first liquid 3. The second end 52 is a closed end projecting from the outer surface 18 of the sealing member 11. The electrode pipe 5 is further inserted through a fixing member 19 to be hereinafter described, and the second end 52 is located outside of the fixing member 19 and connected to a power unit (not shown).

The hollow electrode pipe 5 is formed of a conductive material such as gold or aluminum. The electrode pipe 5 has an inner diameter of 0.5 mm, for example. The electrode pipe 5 may be composed of a hollow conductor pipe formed of a conductive material and an insulating protective film formed on the surface of the conductor pipe. This conductive pipe has a first end as an open end projecting from the inner surface 12 of the sealing member 11 to come into contact with the first liquid 3 and a second end as a closed end projecting from the outer surface 18 of the sealing member 11.

The liquid lens device 100 further includes a fixing member 19 for fixing the first transparent substrate 9 and the second transparent substrate 10 to each other. The fixing member 19 is composed of a first member 20, a second member 21, and a bonding member 22 for bonding the first member 20 and the second member 21. The first transparent substrate 9 and the second transparent substrate 10 are pressed by the first member 20 and the second member 21, respectively, in such a direction as to sandwich the sealing member 11, thereby elastically deforming the sealing member 11 to seal the liquid chamber 1. In this condition, the first member 20 and the second member 21 are fixed through the bonding member 22, thereby maintaining the sealed condition of the liquid chamber 1.

The first member 20 has an abutting surface 20a abutting against the first transparent substrate 9 and a bonded surface 20b bonded through the bonding member 22 to the second member 21. The abutting surface 20a is formed with a light transmitting hole 20c corresponding to the light transmitting area A of the first transparent substrate 9. The first member 20 is formed of metal or synthetic resin, for example.

Similarly, the second member 21 has an abutting surface 21a abutting against the second transparent substrate 10 and a bonded surface 21b bonded through the bonding member 22 to the first member 20. The abutting surface 21a is formed with a light transmitting hole 21c corresponding to the light transmitting area A of the second transparent substrate 10. The second member 21 is also formed of metal or synthetic resin, for example.

Figure 2:
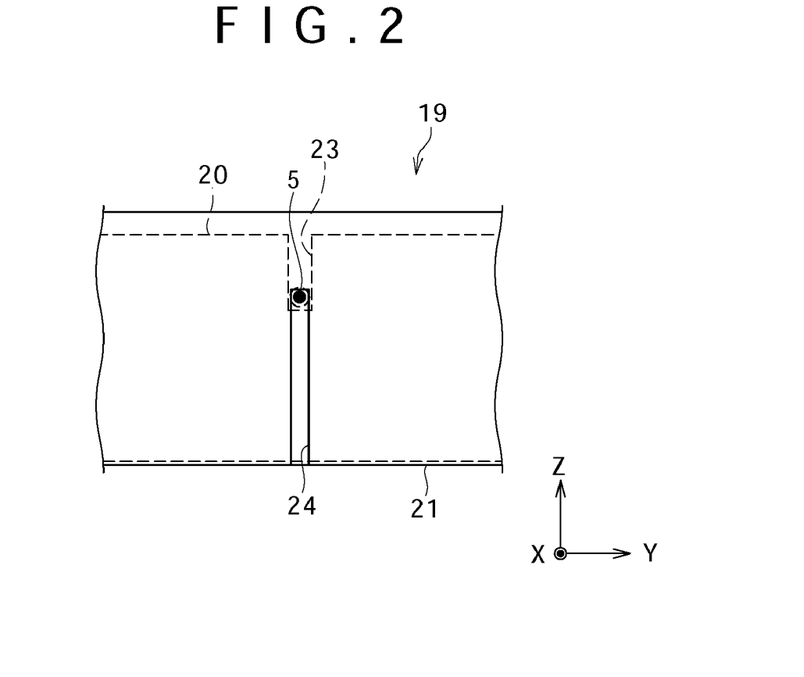
FIG. 2 is a view for illustrating the shape of a fixing member at a position where an electrode pipe is mounted in the liquid lens device shown in FIG. 1.

FIG. 2 is a view for illustrating the shape of the fixing member 19 at a position where the electrode pipe 5 is mounted. That is, FIG. 2 is a side view of the liquid lens device 100 as viewed from its one side where the electrode pipe 5 projects (side view taken in the direction X in FIG. 1). In FIG. 2, the bonding member 22 shown in FIG. 1 is omitted.

As shown in FIG. 2, the first member 20 is formed with a recess 23 extending from the second transparent substrate 10 side toward the first transparent substrate 9 side. Similarly, the second member 21 is formed with a recess 24 extending from the first transparent substrate 9 side toward the second transparent substrate 10 side. The first member 20 and the second member 21 are combined so that the recesses 23 and 24 overlap each other at a position where the electrode pipe 5 is mounted. That is, the electrode pipe 5 is inserted through the recesses 23 and 24 of the fixing member 19.

The shape of the recesses 23 and 24 is not especially limited, but any shape allowing the insertion of the electrode pipe 5 through the fixing member 19 may be adopted. For example, in the case that the first member 20 and the second member 21 are formed of metal, there is a possibility that the electrode pipe 5 may come into contact with the first member 20 and the second member 21, causing the production of a short-circuit current. Accordingly, in this case, it is considered that the recesses 23 and 24 are formed so as to avoid the contact between the electrode pipe 5 and the first and second members 20 and 21.

Although not shown in FIG. 2, the bonding member 22 may be provided by a platelike member inserted between the first member 20 and the second member 21, wherein this platelike member has a recess similar to the recess 23 of the first member 20. Alternatively, the bonding member 22 may be provided by thermosetting resin, ultraviolet (UV) curing resin, or pressure-sensitive adhesive, for example, filled in the spacing between the first member 20 and the second member 21.

[Operation of Liquid Lens Device]

The operation of the liquid lens device 100 will now be described. As described above, the lens surface 17 is formed by the first liquid 3 and the second liquid 4 in the liquid chamber 1. In this preferred embodiment, the lens surface 17 is formed by the first liquid 3 having a convex surface and the second liquid 4 having a concave surface. Further, in this preferred embodiment, light enters the liquid lens device 100 from the second transparent substrate 10 and emerges from the first transparent substrate 9. Since the refractive index of the second liquid 4 is larger than that of the first liquid 3 in this preferred embodiment, the light entered from the second transparent substrate 10 diverges on the lens surface 17 and next emerges from the first transparent substrate 9.

The degree of divergence of light emerging from the first transparent substrate 9, i.e., the focal length of light passing through the lens surface 17 is determined by the curvature of the lens surface 17. In the case that no voltage is applied to the conductor layer 14 and the electrode pipe 5 connected to the power circuit, the curvature of the lens surface 17 is determined by the physical properties of the first liquid 3, the second liquid 4, and the insulating layer 15 and the shape and size of the through hole 13 of the base substrate 8, for example. Accordingly, the materials of the first liquid 3, the second liquid 4, and the insulating layer 15 are suitably set in order to obtain desired optical characteristics. Further, the shape and size of the through hole 13 are also suitably set. For example, the sectional shape of the through hole 13 may be set so that the inner surface of the base substrate 8 is tapered or curved.

Figure 3:
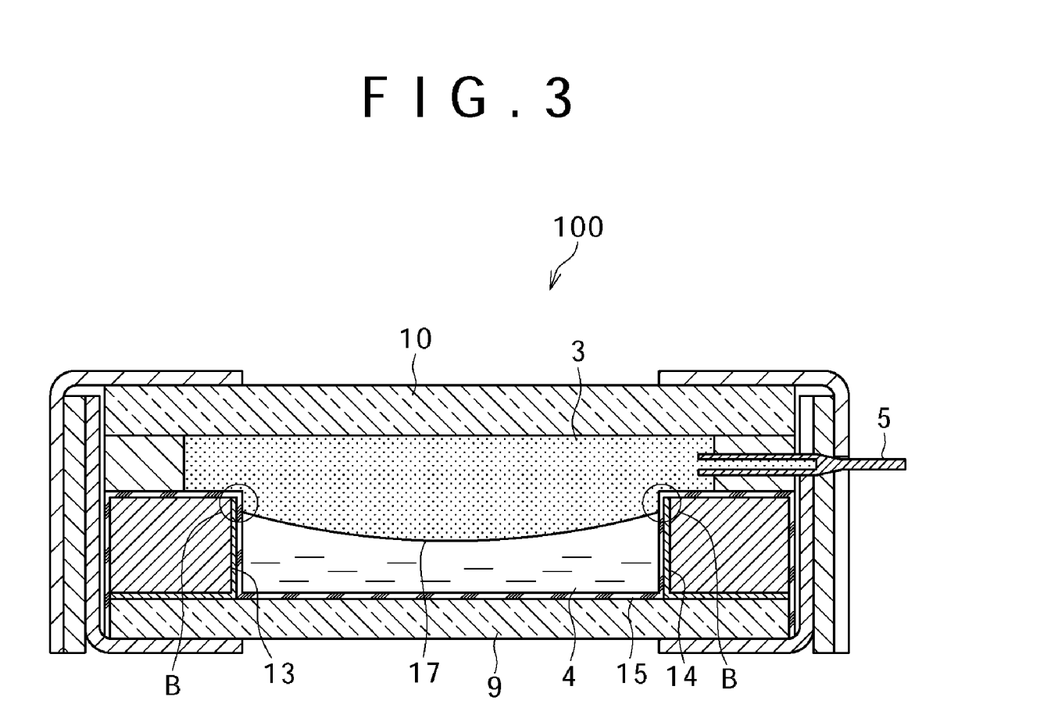
FIG. 3 is a schematic sectional view of the liquid lens device in the case that a voltage is applied to a conductor layer and the electrode pipe.

FIG. 3 is a schematic sectional view of the liquid lens device 100 in the case that a voltage is applied to the conductor layer 14 and the electrode pipe 5. When a predetermined voltage is applied to the conductor layer 14 and the electrode pipe 5, electric charge is accumulated in the conductor layer 14 and the first liquid 3 opposed to each other with the insulating layer 15 interposed therebetween. The electric charge in the conductor layer 14 attracts the electric charge in the first liquid 3 to result in wetting of the surface of the insulating layer 15 with the first liquid 3 (electrowetting phenomenon). In this preferred embodiment, the surface of the insulating layer 15 is wetted with the first liquid 3 at an end portion of the through hole 13 on the second transparent substrate 10 side (an encircled portion B shown in FIG. 3). As a result, the second liquid 4 is pushed by the first liquid 3 to gather at a central portion of the liquid chamber 1. Accordingly, the curvature of the lens surface 17 is decreased as shown in FIG. 3, so that the degree of divergence of light emerging from the first transparent substrate 9 is also decreased. In other words, the focal length of light passing through the lens surface 17 is increased. The voltage to be applied to the conductor layer 14 and the electrode pipe 5 may be DC voltage or AC voltage.

The curvature of the lens surface 17 changes according to the voltage applied to the conductor layer 14 and the electrode pipe 5. When the curvature of the lens surface 17 changes, the focal length of light passing through the lens surface 17 also changes. Accordingly, the liquid lens device 100 according to this preferred embodiment can be used as a variable focus lens device.

[Manufacturing Method for Liquid Lens Device]

A manufacturing method for a liquid lens device according to an embodiment of the present application will now be described. In the following description, a manufacturing method for the liquid lens device 100 mentioned above will be described.

[Assembling Step for the First Transparent Substrate]

Figure 4A:
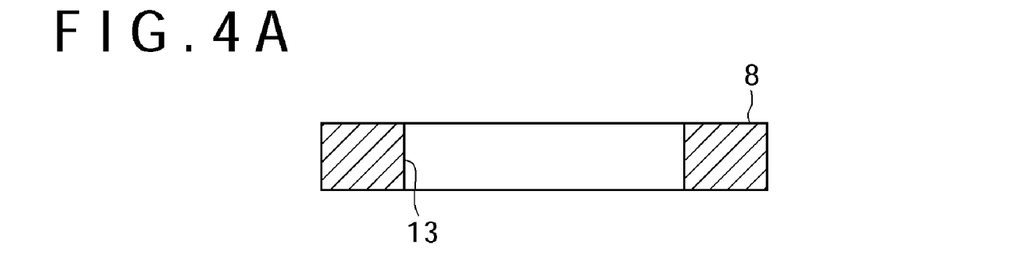
FIGS. 4A to 4D are sectional views for illustrating an assembling step for a first transparent substrate in a manufacturing method for the liquid lens device.
Figure 4B:
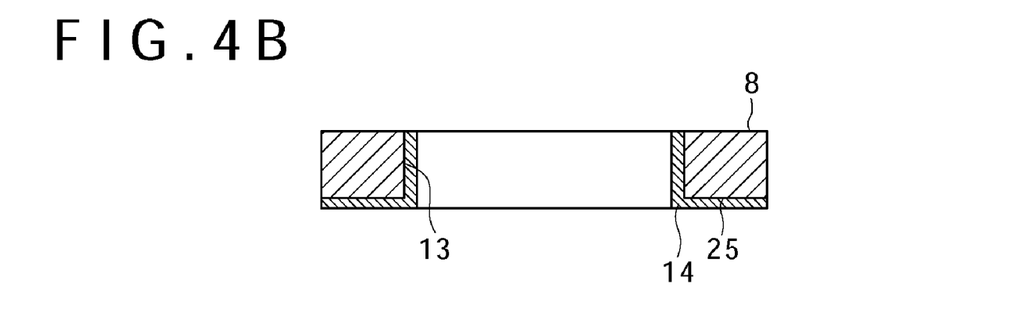

FIGS. 4A to 4D are sectional views for illustrating an assembling step for the first transparent substrate 9. As shown in FIG. 4A, the through hole 13 is formed through the base substrate 8. For example, the through hole 13 is formed by molding such as injection molding. As shown in FIG. 4B, the conductor layer 14 is continuously formed on the inner surface of the through hole 13 and the lower surface 25 of the base substrate 8. The conductor layer 14 is formed by sputtering or plating, for example. As required, the conductor layer 14 may be patterned and formed on the inner surface of the through hole 13 and the lower surface 25 of the base substrate 8.

Figure 4C:
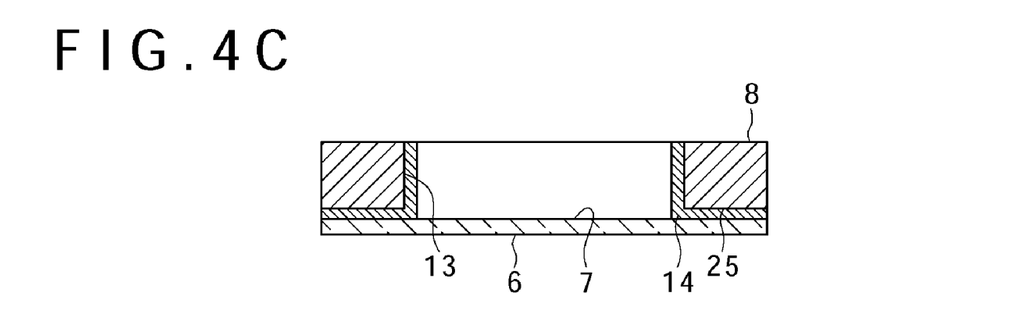

As shown in FIG. 4C, the light transmitting substrate 6 is bonded to the lower surface 25 of the base substrate 8 on which the conductor layer 14 is formed. The upper surface of the light transmitting substrate 6 bonded to the base substrate 8 corresponds to the surface 7 mentioned above with reference to FIG. 1. The base substrate 8 and the light transmitting substrate 6 are bonded to each other by any method such as adhesion, ultrasonic welding, diffusion bonding, swaging, bolting, or anodic bonding.

Figure 4D:
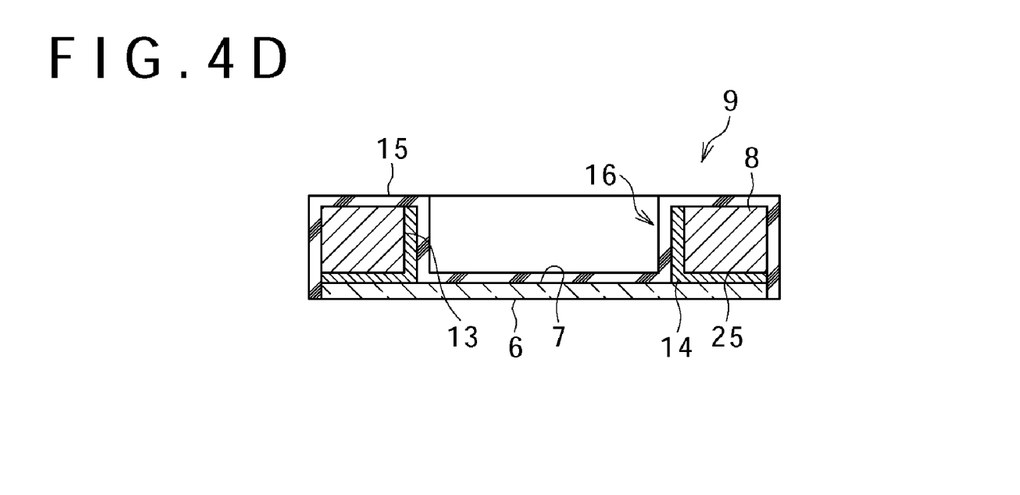

As shown in FIG. 4D, the insulating layer 15 is formed so as to cover the conductor layer 14 formed on the through hole 13. The insulating layer 15 is formed by any coating method such as CVD as mentioned above. In this preferred embodiment, the insulating layer 15 is also formed on the surface 7 of the light transmitting substrate 6 in its non-bonded area to the base substrate 8 and on the other surface (upper surface) of the base substrate 8 opposite to the lower surface 25 in a continuous manner to the inner surface of the through hole 13. However, the area for forming the insulating layer 15 is not limited to the above-mentioned area, but any area may be adopted provided that the insulating layer 15 can cover the conductor layer 14. For example, the insulating layer 15 may be discontinuously formed in a predetermined area on the surface 7 of the light transmitting substrate 6. Thus, the electrode layer 16 having a laminated structure composed of the conductor layer 14 and the insulating layer 15 is formed on the inner surface of the through hole 13 as shown in FIG. 4D.

[Assembling Step for the Body]

Figure 5A:
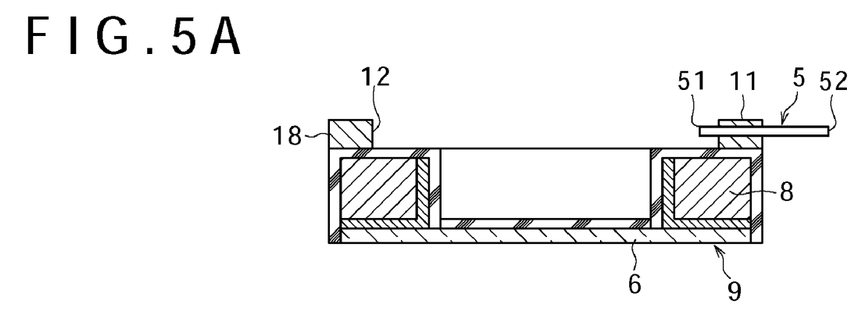
FIGS. 5A to 5D are sectional views for illustrating an assembling step for a body in the manufacturing method.

FIGS. 5A to 5D are sectional views for illustrating an assembling step for the body 2. As shown in FIG. 5A, the annular sealing member 11 is placed on the base substrate 8 of the first transparent substrate 9. For example, a groove may be formed on the base substrate 8, and the sealing member 11 may be engaged with this groove in placing the sealing member 11 on the base substrate 8. The hollow electrode pipe 5 is preliminarily inserted through the sealing member 11 as shown in FIG. 5A.

The mounting method for the electrode pipe 5 to the sealing member 11 is not especially limited. For example, the first end 51 or the second end 52 of the electrode pipe 5 may be sharply formed and the sealing member 11 may be pierced with the electrode pipe 5 having the sharp end 51 or 52. Alternatively, a through hole may be preliminarily formed in the sealing member 11 and the electrode pipe 5 may be inserted through this through hole. In this stage, both the first end 51 and the second end 52 of the electrode pipe 5 are open, so that the inner surface 12 and the outer surface 18 of the sealing member 11 are in communication with each other through the open ends 51 and 52 of the electrode pipe 5.

Figure 5B:
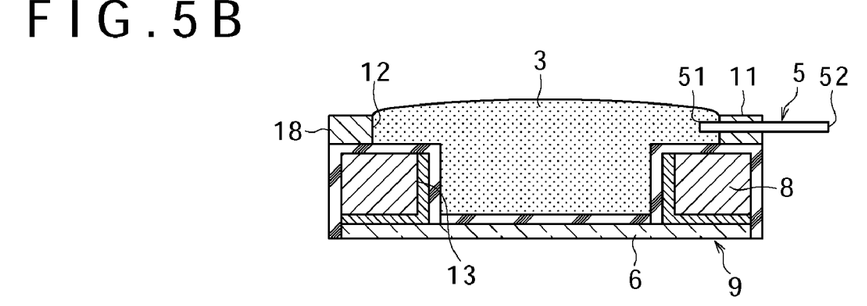

As shown in FIG. 5B, the conductive first liquid 3 is charged into the space defined by the inner surface of the through hole 13 and the inner surface 12 of the sealing member 11. The amount of the first liquid 3 to be charged is not especially limited provided that it is larger than the amount of the first liquid 3 to be stored in the liquid chamber 1 of the liquid lens device 100 finally obtained. For example, the first liquid 3 may be charged into the space defined by the inner surface of the through hole 13 and the inner surface 12 of the sealing member 11 in such an amount that this space is sufficiently filled with the first liquid 3, thereby preventing the production of air bubbles in the liquid chamber 1 to be formed later. As a charging method for the first liquid 3, the first transparent substrate 9 with the sealing member 11 placed thereon as shown in FIG. 5A may be immersed in the first liquid 3 contained in a tank, thereby charging the first liquid 3 into the space defined by the inner surface of the through hole 13 and the inner surface 12 of the sealing member 11. Alternatively, the first liquid 3 may be charged by using a syringe or the like.

Figure 5C:
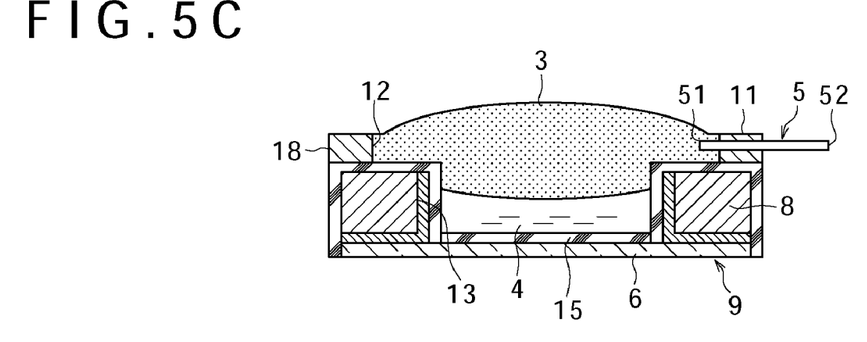

As shown in FIG. 5C, the insulating second liquid 4 is charged into the space defined by the inner surface of the through hole 13 and the inner surface 12 of the sealing member 11. More specifically, the second liquid 4 is charged into the through hole 13 of the first transparent substrate 9 by using a syringe, for example. The insulating layer 15 formed on the first transparent substrate 9 has water repellency, so that the second liquid 4 wets the surface of the insulating layer 15 so as to push up the first liquid 3.

Figure 5D:
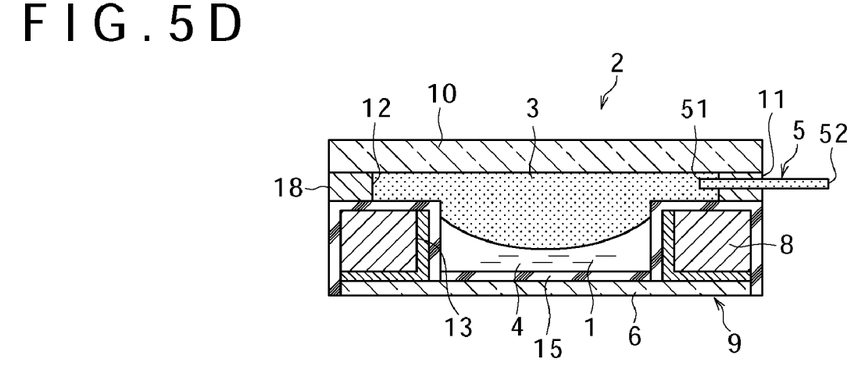

As shown in FIG. 5D, the second transparent substrate 10 is placed on the sealing member 11. By performing this step, the liquid chamber 1 is defined as the space enclosed by the first transparent substrate 9, the second transparent substrate 10, and the sealing member 11. Thus, the body 2 having the liquid chamber 1 is prepared. The liquid chamber 1 is filled with the first liquid 3 and the second liquid 4 separated from each other, and the first end 51 of the electrode pipe 5 is in contact with the first liquid 3. In placing the second transparent substrate 10 on the sealing member 11, the first liquid 3 may or may not be discharged from the second end 52 of the electrode pipe 5.

In the step shown in FIG. 5A, the electrode pipe 5 may not be mounted to the sealing member 11. In this case, the electrode pipe 5 may be mounted to the sealing member 11 after performing the step shown in FIG. 5D. However, it is preferable to securely mount the electrode pipe 5 to the sealing member 11 before placing the sealing member 11 on the first transparent substrate 9 as in this preferred embodiment, thereby improving the reliability of a sealing operation for the liquid chamber 1 to be described later.

[Sealing Step for the Liquid Chamber]

Figure 6A:
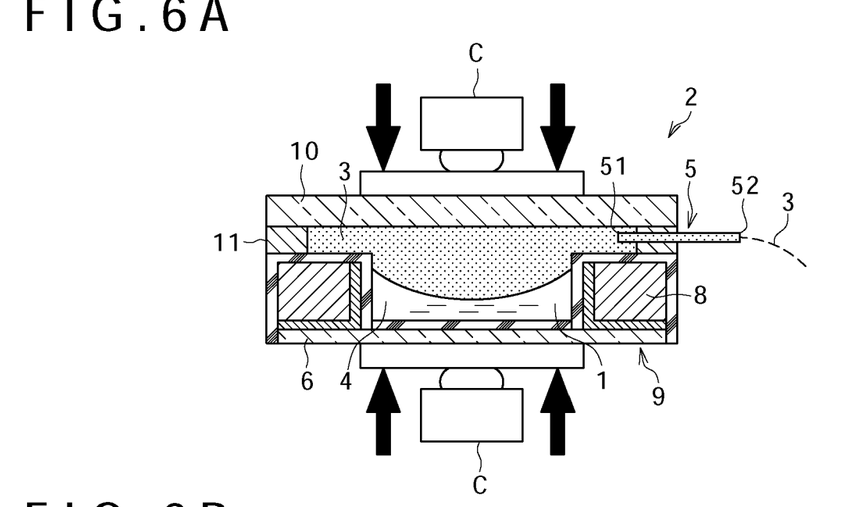
FIGS. 6A to 6C are sectional views for illustrating a sealing step for a liquid chamber in the manufacturing method.
Figure 6B:
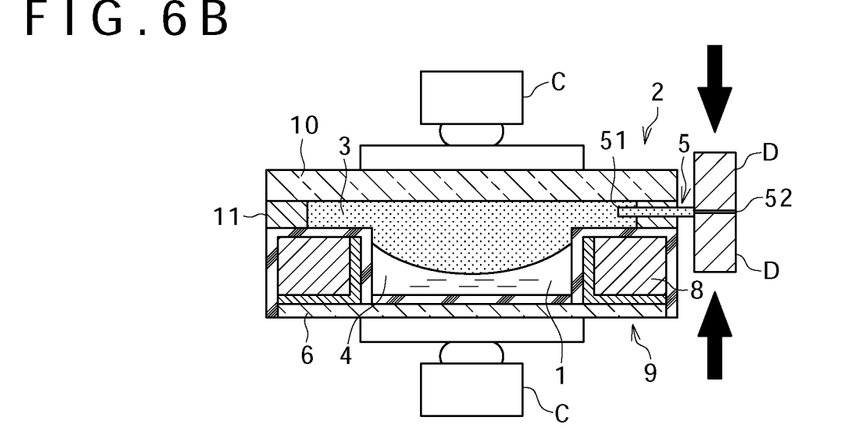
Figure 6C:
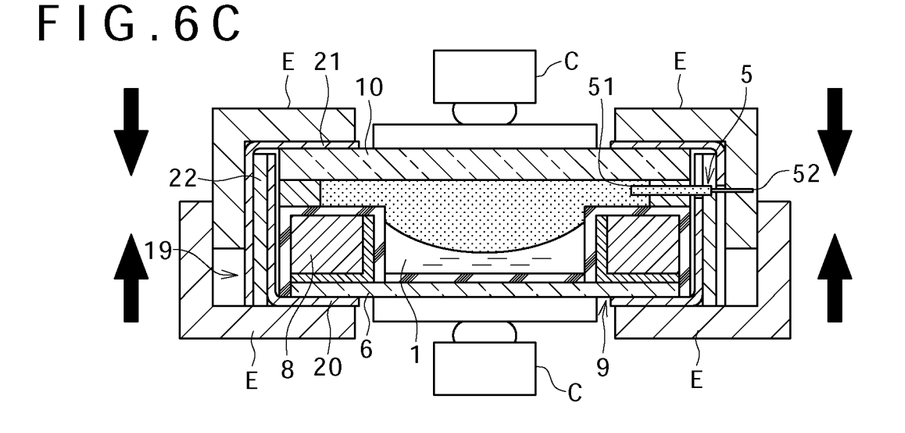

FIGS. 6A to 6C are sectional views for illustrating a sealing step for the liquid chamber 1 of the body 2 prepared by the steps shown in FIGS. 5A to 5D. As shown in FIG. 6A, a pressure applying mechanism C is used to apply pressure to the first transparent substrate 9 and the second transparent substrate 10 in the opposite directions shown by arrows in FIG. 6A, thereby compressing the sealing member 11. As a result, the volume of the liquid chamber 1 is reduced and the first liquid 3 kept in contact with the first end 51 of the electrode pipe 5 is discharged from the second end 52.

Accordingly, even when the pressure as an overload is applied to the liquid chamber 1 by the pressure applying mechanism C, an excess rise in pressure in the liquid chamber 1 can be suppressed to thereby prevent damage to the liquid chamber 1. Accordingly, no skill is required for the sealing operation for the liquid chamber 1, and no high-precision press is also required. Thus, the workability in sealing the liquid chamber 1 can be improved.

Further, since the electrode pipe 5 is mounted to the sealing member 11, the spacing between the electrode pipe 5 and the sealing member 11 can be sealed by an elastic force of the sealing member 11. Accordingly, any additional sealing member for ensuring the sealed condition of the liquid chamber 1 is not required at a portion for mounting the electrode pipe 5, so that a reduction in the workability in sealing the liquid chamber 1 can be prevented.

As shown in FIG. 6B, a swaging mechanism D is used to close the second end 52 of the electrode pipe 5 by swaging. As a result, the liquid chamber 1 storing the first liquid 3 and the second liquid 4 is sealed. The closing of the second end 52 of the electrode pipe 5 may be performed by laser welding or filling of an adhesive, for example. The closing of the second end 52 by swaging in this preferred embodiment is a simple operation, so that an increase in equipment cost can be suppressed.

As shown in FIG. 6C, another pressure applying mechanism E is used to mount the fixing member 19 to the body 2, thereby fixing the first transparent substrate 9 and the second transparent substrate 10 to each other. That is, the first member 20 of the fixing member 19 abutting against the first transparent substrate 9 and the second member 21 of the fixing member 19 abutting against the second transparent substrate 10 are pressed by the pressure applying mechanism E in the opposite directions shown by arrows in FIG. 6C. As a result, the first transparent substrate 9 and the second transparent substrate 10 are pressed so as to further compress the sealing member 11. Accordingly, the liquid chamber 1 is further sealed.

To avoid the contact between the pressure applying mechanism E and the electrode pipe 5 in pressing the second member 21, the pressure applying mechanism E is formed with a recess. This recess of the pressure applying mechanism E may be similar in shape to the recess 24 of the second member 21 mentioned above. However, this recess of the pressure applying mechanism E is not limited in shape provided that the contact between the pressure applying mechanism E and the electrode pipe 5 can be avoided.

The first member 20 and the second member 21 are bonded through the bonding member 22. Thus, the first and second members 20 and 21 are fixed to each other by the bonding member 22.

In this manner, the liquid lens device 100 is manufactured. The conductor layer 14 and the electrode pipe 5 in the liquid lens device 100 are connected to an external power source by soldering or using a clamp, for example, so that the electrode pipe 5 is used as a terminal for exhibiting an electrowetting phenomenon.

In the step shown in FIG. 6C, the fixing member 19 may be mounted to the body 2 by tightening screws or the like. In tightening the screws after temporarily setting the fixing member 19, the sealing member 11 may be further compressed.

Further, in mounting the fixing member 19 by the use of the pressure applying mechanism E, the pressure in the liquid chamber 1 may be adjusted. As a method of adjusting the pressure in the liquid chamber 1, the following method may be adopted. In the step shown in FIG. 6A, the amount of the first liquid 3 to be discharged from the second end 52 of the electrode pipe 5, the pressure to be applied by the pressure applying mechanism C, or the stroke of the pressure applying mechanism C is specified. After performing the step shown in FIG. 6A under the above-specified condition, the second end 52 of the electrode pipe 5 is closed as shown in FIG. 6B. Thereafter, in the step shown in FIG. 6C, the pressure to be applied by the pressure applying mechanism E or the stroke of the pressure applying mechanism E is specified, and the fixing member 19 is next mounted to the body 2 under the above-specified condition. By performing these series of steps to seal the liquid chamber 1, the pressure in the liquid chamber 1 can be adjusted to a predetermined pressure. However, the parameter to be specified in obtaining a predetermined pressure in the liquid chamber 1 is not limited to the above.

In this manner, the sealing member 11 may be further compressed by the first and second transparent substrates 9 and 10 in fixing the first and second transparent substrates 9 and 10 by using the fixing member 19. Further, in adjusting the pressure in the liquid chamber 1, the sealing member 11 may be further compressed by the fixing member 19 mounted to the first and second transparent substrates 9 and 10. Thereafter, the first and second transparent substrates 9 and 10 may be fixed. Thus, the first and second transparent substrates 9 and 10 are fixed by the fixing member 19 to thereby ensure the sealed condition of the liquid chamber 1.

Further, the sealing member 11 may be further compressed by the pressure applying mechanism C after closing the second end 52 of the electrode pipe 5 and before mounting the fixing member 19. In this case, the liquid chamber 1 can be further sealed, the pressure in the liquid chamber 1 can be adjusted, or the fixing member 19 can be mounted from the opposite sides of the body 2.

As described above, even when the sealing member 11 is further compressed or the pressure in the liquid chamber 1 is adjusted after the closing step shown in FIG. 6B, the first liquid 3 is discharged before the closing step, thereby suppressing an excess rise in pressure in the liquid chamber 1 to reduce the possibility of damage to the liquid chamber 1.

In the liquid lens device 100 manufactured above, the electrode pipe 5 can be used both as a component for improving the sealing operation for the liquid chamber 1 and as a terminal for exhibiting an electrowetting phenomenon. Accordingly, in the case of forming a thin-film conductor on the second transparent substrate 10 by sputtering or vacuum evaporation, for example, as an electrode for applying a voltage to the first liquid 3, it is possible to suppress a reduction in workability and an increase in cost in the manufacture of the liquid lens device 100. Further, as described above, any additional sealing member for ensuring the sealed condition of the liquid chamber 1 is not required at a portion for mounting the electrode pipe 5, so that the sealed condition of the liquid chamber 1 can be ensured without increasing the number of parts of the liquid lens device 100.

[Modifications]

The present application is not limited to the above preferred embodiment, but various modifications may be made without departing from the scope of the present application.

Figure 7:
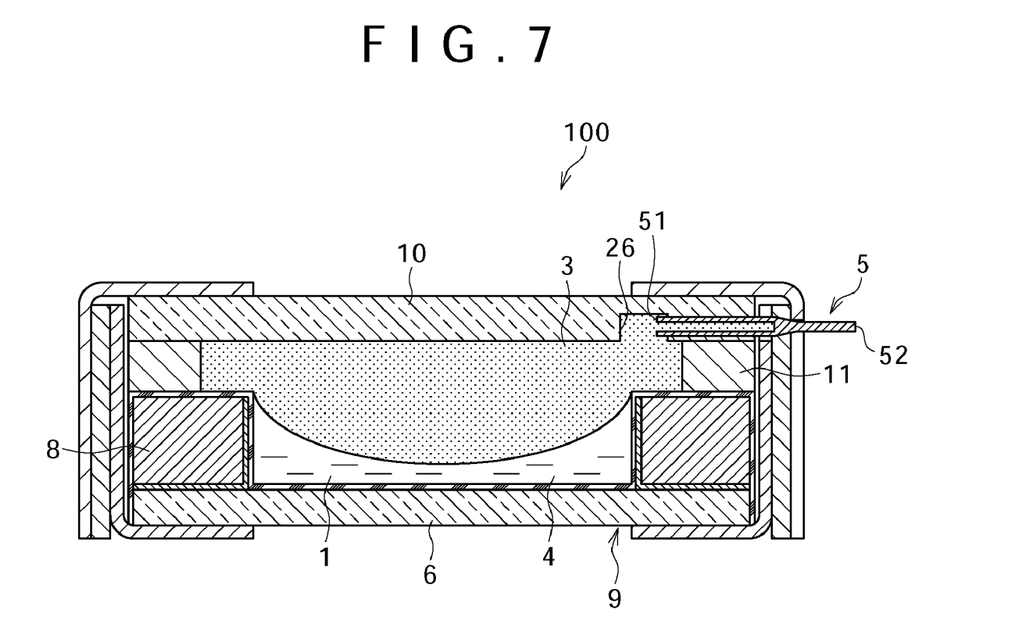
FIG. 7 is a schematic sectional view showing a modification in the mount position of the electrode pipe in the liquid lens device shown in FIG. 1.

For example, FIG. 7 shows a modification in the mount position of the electrode pipe 5. As shown in FIG. 7, the electrode pipe 5 is mounted to the second transparent substrate 10 rather than the sealing member 11. For example, the electrode pipe 5 is integrally mounted to the second transparent substrate 10 by insert molding. Alternatively, the second transparent substrate 10 may be formed with a hole for insertion of the electrode pipe 5, and the electrode pipe 5 may be inserted into this hole and then fixed by adhesion. As shown in FIG. 7, the second transparent substrate 10 is formed with a recess 26 for allowing the contact between the first end 51 of the electrode pipe 5 and the first liquid 3. However, the mount position of the electrode pipe 5 is not limited to the sealing member 11 and the second transparent substrate 10, but any position may be adopted provided that the first end 51 of the electrode pipe 5 comes into contact with the first liquid 3 and that the first liquid 3 can be discharged in the sealing step for the liquid chamber 1.

The shape of the electrode pipe 5 may be modified. For example, the first end 51 kept in contact with the first liquid 3 or the second end 52 located outside of the liquid chamber 1 may be formed as plural ends. Further, the electrode pipe 5 may be bent. Thus, the shape of the electrode pipe 5 may be suitably set according to the shape or size of the liquid lens device 100.

While the inner diameter of the electrode pipe 5 is set to 0.5 mm, for example, in this preferred embodiment, the inner diameter of the electrode pipe 5 may be suitably set. By suitably setting the inner diameter of the electrode pipe 5, the easiness of discharge of the first liquid 3 from the second end 52 can be suitably set. For example, the inner diameter of the electrode pipe 5 may be suitably set according to the viscosity of the first liquid 3.

A plurality of electrode pipes 5 may be mounted to the body 2. For example, in the case that the base substrate 8 is formed with a plurality of through holes 13 to use the liquid lens device 100 as a lens array, it is considered that the plural electrode pipes 5 are mounted so as to respectively correspond to the plural through holes 13.

Figure 8A:
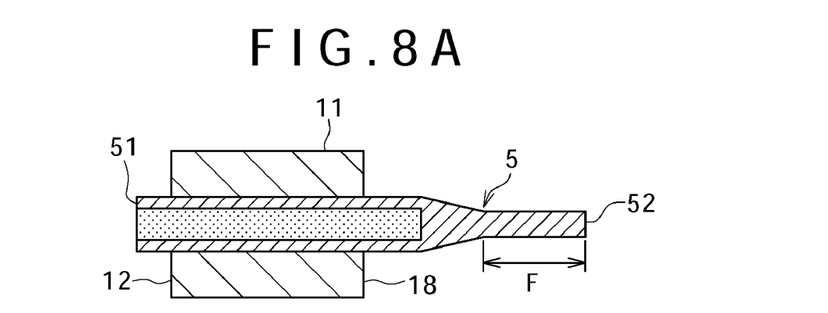
FIG. 8A is an enlarged sectional view of the electrode pipe having a closed second end shown in FIG. 1.
Figure 8B:
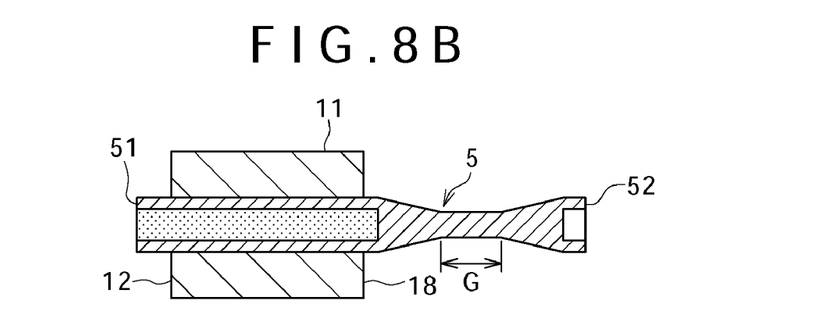
FIG. 8B is a view similar to FIG. 8A, showing a modification thereof.

FIG. 8A is an enlarged sectional view of the electrode pipe 5 having the closed second end 52 shown in FIG. 1, and FIG. 8B is a view similar to FIG. 8A, showing a modification thereof. In each case, the electrode pipe 5 is mounted to the sealing member 11. In the electrode pipe 5 shown in FIG. 8A, an area F including the second end 52 is closed. In the electrode pipe 5 shown in FIG. 8B, an area G not including the second end 52 is closed. Any area of the electrode pipe 5 may be closed by the closing step shown in FIG. 6B provided that the liquid chamber 1 is sealed and the first liquid 3 is not discharged.

As another modification, the electrode pipe 5 may be provided with a valve mechanism such as an on-off valve, wherein the second end 52 of the electrode pipe 5 is closed by the valve mechanism. Further, the electrode pipe 5 may be provided with a check valve, wherein a pressure for opening the check valve is set to thereby set the closing condition of the second end 52. That is, when the pressure in the liquid chamber 1 becomes smaller than the pressure for opening the check valve, the second end 52 is closed. Thus, the pressure in the liquid chamber 1 is adjusted.

Further, the closing step for the second end 52 shown in FIG. 6B may be performed together with the pressure applying step for the first and second transparent substrates 9 and 10 shown in FIG. 6A. For example, a pressure applying mechanism including the pressure applying mechanism C shown in FIG. 6A and the swaging mechanism D shown in FIG. 6B may be used, wherein the closing step by the swaging mechanism D is started to close the second end 52 just before ending the operation of the pressure applying mechanism C.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A manufacturing method for a liquid lens device comprising:
   preparing a body having a liquid chamber, a conductive first liquid stored in said liquid chamber, an insulating second liquid stored in said liquid chamber, and a hollow electrode pipe for making the communication between the inside and the outside of said liquid chamber, said liquid chamber being defined by a first transparent substrate on which an electrode layer is formed, a second transparent substrate opposed to said first transparent substrate, and an annular sealing member interposed between said first transparent substrate and said second transparent substrate, said first liquid and said second liquid having different refractive indices and being immiscible with each other, said hollow electrode pipe having a first end kept in contact with said first liquid and a second end located outside of said liquid chamber;
   applying pressure to said first and second transparent substrates to thereby compress said sealing member and discharge said first liquid from said second end of said hollow electrode pipe; and
   closing said second end of said hollow electrode pipe.

2. The manufacturing method for the liquid lens device according to claim 1, wherein said preparing said body includes:
   mounting said electrode pipe to said sealing member so that said first end of said electrode pipe projects from the inner surface of said sealing member and said second end of said electrode pipe projects from the outer surface of said sealing member;
   placing said sealing member with said electrode pipe on said first transparent substrate;
   charging said first liquid and said second liquid into a space formed by said first transparent substrate and said sealing member; and
   placing said second transparent substrate on said sealing member.

3. The manufacturing method for the liquid lens device according to claim 1, wherein closing said second end includes:
   swaging said second end.

4. The manufacturing method for the liquid lens device according to claim 1, further comprising:
   further applying pressure to said first and second transparent substrates to thereby further compress said sealing member after performing said step of closing said second end.

5. The manufacturing method for the liquid lens device according to claim 4, wherein further applying pressure includes:
   fixing said first and second transparent substrates to each other by using a fixing member.

6. The manufacturing method for the liquid lens device according to claim 1, further comprising:
   connecting said second end closed and said electrode layer to a power circuit provided outside of said body.

7. A liquid lens device comprising:
   a conductive first liquid;
   an insulating second liquid having a refractive index different from that of said first liquid;
   a body having a sealed liquid chamber defined by a first transparent substrate having a light transmitting area, a second transparent substrate having a light transmitting area opposed to said first transparent substrate, and an annular sealing member interposed between said first transparent substrate and said second transparent substrate, said liquid chamber storing said first liquid and said second liquid immiscible with each other;
   an electrode layer formed on a part of the inner surface of said liquid chamber, said electrode layer having a laminated structure composed of a conductor layer and an insulating layer covering said conductor layer; and
   a hollow electrode pipe including a hollow conductor pipe having a first end as an open end kept in contact with said first liquid in said liquid chamber and a second end as a closed end located outside of said liquid chamber, wherein when a voltage is applied between said first liquid and said electrode layer through said electrode pipe, the shape of the interface between said first liquid and said second liquid is changed.

8. The liquid lens device according to claim 7, wherein:
   the inner surface of said sealing member forms a part of the inner surface of said liquid chamber; and
   said electrode pipe is inserted through said sealing member so that said first end projects from the inner surface of said sealing member and said second end projects from the outer surface of said sealing member.

9. The liquid lens device according to claim 7, further comprising
   a fixing member for fixing said first and second transparent substrates to each other.

* * * * *